United States Patent
Li

(10) Patent No.: US 8,838,596 B2
(45) Date of Patent: Sep. 16, 2014

(54) SYSTEMS AND METHODS TO PROCESS ENQUIRES BY RECEVING AND PROCESSING USER DEFINED SCOPES FIRST

(76) Inventor: De Xiong Li, Sunnyvale, CA (US)

(*) Notice: Subject to any disclaimer, the term of this patent is extended or adjusted under 35 U.S.C. 154(b) by 6 days.

(21) Appl. No.: 13/066,495

(22) Filed: Apr. 15, 2011

(65) Prior Publication Data

US 2011/0264695 A1 Oct. 27, 2011

Related U.S. Application Data

(60) Provisional application No. 61/324,302, filed on Apr. 15, 2010.

(51) Int. Cl.
*G06F 7/00* (2006.01)
*G06F 17/30* (2006.01)

(52) U.S. Cl.
CPC ............................. *G06F 17/30864* (2013.01)
USPC .......................................... 707/736; 707/737

(58) Field of Classification Search
CPC ... G06F 17/30; G06F 17/271; G06F 17/2785; G06F 17/30864; G06F 17/30887; G06F 17/3087; G06F 17/30126; G06F 17/30607; G06F 17/2229; G06F 17/30873; G06F 17/30902

USPC ............................................ 707/770, 736, 737
See application file for complete search history.

(56) References Cited

U.S. PATENT DOCUMENTS

| 7,814,554 | B1 * | 10/2010 | Ragner | 726/27 |
| 7,945,953 | B1 * | 5/2011 | Salinas et al. | 726/22 |
| 2003/0195021 | A1 * | 10/2003 | Yamashita et al. | 463/1 |
| 2005/0164725 | A1 * | 7/2005 | Naito et al. | 455/517 |
| 2011/0202270 | A1 * | 8/2011 | Sharma et al. | 701/201 |

* cited by examiner

*Primary Examiner* — Apu Mofiz
*Assistant Examiner* — Fariborz Khoshnoodi
(74) *Attorney, Agent, or Firm* — Bo-In Lin

(57) ABSTRACT

An apparatus for use in managing information content in a network-based communication system. The apparatus includes a processing element that includes a processor managed and operated by an operation system (OS) software and coupled to a memory. The processing element executes a first application to call a second application for permitting the user to enter a plurality of defining terms for the second application to apply the defining terms as search filters for searching and retrieving uniform resource locators for linking to contents relevant to the defining terms entered by the user. The second application further determines whether to call the OS depending on the search filters generated from the defining terms.

4 Claims, 3 Drawing Sheets

SYSTEMS AND METHODS TO PROCESS ENQUIRES BY RECEVING AND PROCESSING USER DEFINED SCOPES FIRST

This Non-Provisional Application is based on and claims the Priority of previously filed Provisional Applications 61/324,302 filed on Apr. 15, 2010. The disclosures made in Applications 61/324,302 are hereby incorporated by reference.

BACKGROUND OF THE INVENTION

1. Field of the Invention

This invention relates generally to systems and methods of network-based communication systems. More particularly, this invention relates to the systems and methods of techniques for information content management in the network-based communication systems.

2. Description of the Related Art

Even though there are tremendous progresses made in the data and media content generation, storage, search, transmission and presentation technologies, there are still difficulties and limitations for a network user to convenient perform an enquiry and search process. Specifically, the process of entering the "enquiries" to start a search process often requires a wireless network user to interact with a search system in multiple "refining search" steps by repeating a user's "key-in" enquiry entry step followed by a the search system's response with a "search result presentation" step. Such step-by-step interactively and progressively refining search processes often require a user to type on a miniaturized device with a very small keypad. The search processes become very inconvenient and difficult for these mobile device users.

Such difficulties and limitations cannot be easily resolved due to the basic reasons that the framework of "enquiry entry" and "search" process are often built-in as part of the "operating system" of a mobile devices and the search systems. Changes of the search processes require fundamental and complicate changes to the software supported by the device and also by the search engine called by the mobile devices.

In the meantime, one of the most rapidly expanding aspects of wireless networking involves the accessing of information content over wireless networks via web-enabled mobile devices. Examples of such devices include mobile telephones, personal digital assistants (PDAs), palmtop computers, etc. As is well-known, these and other web-enabled devices not only provide access to the Internet, but can also be used to support other types of wireless networking functionality, such as messaging, distributed collaboration, and location-based services. With the expanded applications of wireless networked devices, especially the increased number of mobile devices, an urgent need exists to resolve the limitation and inconveniences caused by the requirement to key in multiple levels of enquiries before the proper and most relevant search results can be assessed.

Therefore, a need still exists in the field of wireless web-based network communication to provide new and improved system configuration and methods to overcome such limitations.

SUMMARY OF THE PRESENT INVENTION

It is therefore an aspect of the present invention to provide new and improved system configuration and methods to for information and content management in the networked-based communication systems to build a "5W1H" like equerry process. The "5W1H" like equerry process is built on top of the traditional operation system by applying an inter-application or inter-process link scheme without requiring changes made to the operation system of a device or a server such that the "5W1H" like equerry process can be conveniently implemented as a filter to significantly enhance the search/enquiry processes.

Another aspect of the present invention is to provide new and improved system configuration and methods to for information and content management in the networked-based communication systems to build a "5W1H" like equerry process to simplify the operations and processes of the mobile device users. The present invention can provide simplify and convenient processes for a user to easily build a data-space or to enter into a user-targeted cyber space. The present invention can therefore eliminate substantially all of the efforts to search first followed by browsing many retrieved links to select for entering the most relevant cyber space as that often required in the convention processes. The user can quickly and conveniently achieve a more targeted enquiry and accurate retrieval to recognize, watch, communicate, or engage other networked based interactions as intended by the user.

Briefly, in an embodiment, the present invention discloses an apparatus for use in managing information content in a network-based communication system. The apparatus comprising a processing element comprising a processor coupled to a memory. The processing element provides at least a portion of a content management web site identified by a first uniform resource locator and accessible to a user of the communication system, the content management web site permitting the user to enter a plurality of defining terms as search filters for searching and retrieving uniform resource locators for linking to contents relevant to the defining terms entered by the user. In an embodiment, the content management web site constituting a first application calls second applications to permit the user to enter the plurality of defining terms as search filters for searching and retrieving uniform resource locators for linking to contents relevant to the defining terms entered by the user.

In another embodiment, this invention discloses a mobile communication device operated with an operating system to control and manage a plurality of application processes. The mobile communication device further includes a 5W1H, i.e., who-what-when-where-why and how application, called by at least one of the application processes to allow a user of the mobile communication device to enter 5W1H scope-definition terms to carry out the application calls the 5W1H application.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 3 is a flowchart to illustrate the processing steps carried among the mobile devices and the operating system of

DETAILED DESCRIPTION OF THE PREFERRED EMBODIMENT

Figure 1:
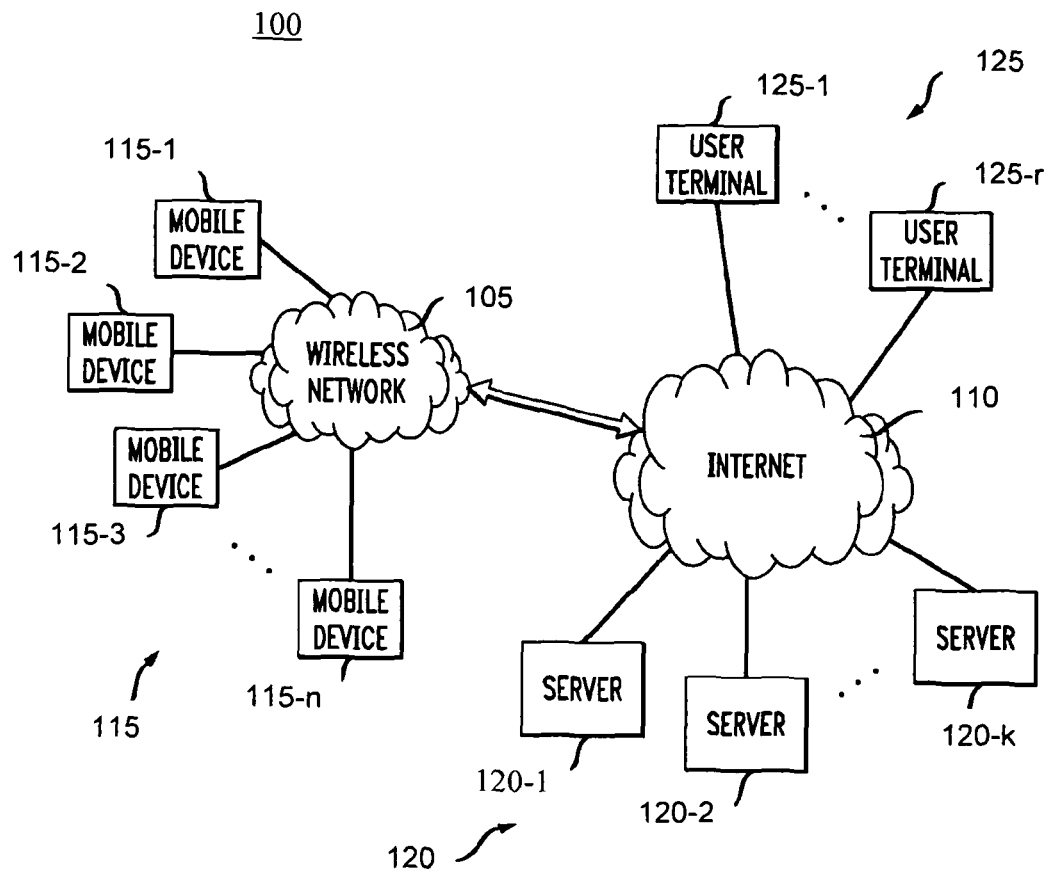
FIG. 1 is a system functional diagram for showing a network-based communication system configured in accordance with an illustrative embodiment of the invention.

FIG. 1 is a system functional diagram for showing a network-based communication system 100 configured in accordance with an illustrative embodiment of this invention. The system 100 includes a wireless network 105 coupled to the Internet 110, a set of mobile devices 115, a set of servers 120 and a set of user terminals 125. As shown in FIG. 1, the numbers n, k, and r are adjustable integer numbers to denote the n mobile devices 115-1, . . . 115-n are coupled to the wireless network 105, k servers 120-1, . . . 120-k and r user terminals 120-1, . . . 120-r are coupled to the Internet 110. Also, alternative embodiments of the invention may not include the particular system elements shown, and may include other elements of a type and configuration known to those skilled in the art, in place of or in addition to the particular elements shown. The mobile devices 115 and user terminals 125 may be more generally referred to herein as user devices. The term "user" is intended to include, without limitation, an individual, a group of individuals, a business, an organization, or any other entity capable of deriving benefit from use of at least a portion of the system 100. Actions described herein as being performed by or otherwise associated with a user may be performed by or otherwise associated with an individual or other entity, a corresponding device, or both the entity and the device. The network configuration of system 100 is shown only as an example. The present invention is not limited by the configuration as shown. The Internet as shown may include an intranet, an extranet, a wide area network (WAN), a metropolitan area network (MAN), a wired local area network (LAN), an IEEE 802.11 or Wi-Fi wireless LAN, a satellite communications network, a virtual private network (VPN), a public switched telephone network (PSTN), a cellular network based on third generation (3G) wideband code division multiple access (CDMA) or other standard, as well as portions or combinations of these and other networks.

The mobile devices 115 may collectively comprise a wide variety of different devices configurable for communication over the network 12. The term "mobile device" as used herein is intended to include, without limitation, any type of portable information processing device capable of being configured for communication over a network. Examples of mobile devices 115 utilizable in FIG. 1 include a mobile telephone, a personal digital assistant (PDA), a palmtop computer, a handheld computer, a laptop computer, a tablet computer, a global positioning system (GPS) receiver or other GPS-based navigational device, an MP3 player or other type of audio player, a pager, a watch or other timepiece, a camera, a portable game player, etc. The servers 120 may comprise, by way of example, network computers or other types of computers or processing elements capable of being configured for the maintenance, storage, delivery or other processing of information received or deliverable over the Internet or other type of network. Furthermore, one or more of the user terminals 120 may each comprise a mobile device. Also, a given one of the user terminals 120 may comprise a non-mobile device, including, by way of example, a desktop personal computer, a workstation, a minicomputer, a mainframe computer, a television, a set-top box, a kiosk, etc.

As commonly understood that each of these mobile devices, servers, user terminals, can function as an independent data processing element and each of these data processing elements may include a process, a memory for data storage and a network or communication interface to connect to a network based communication system either through physical connections or through wireless interconnections.

Figure 2:
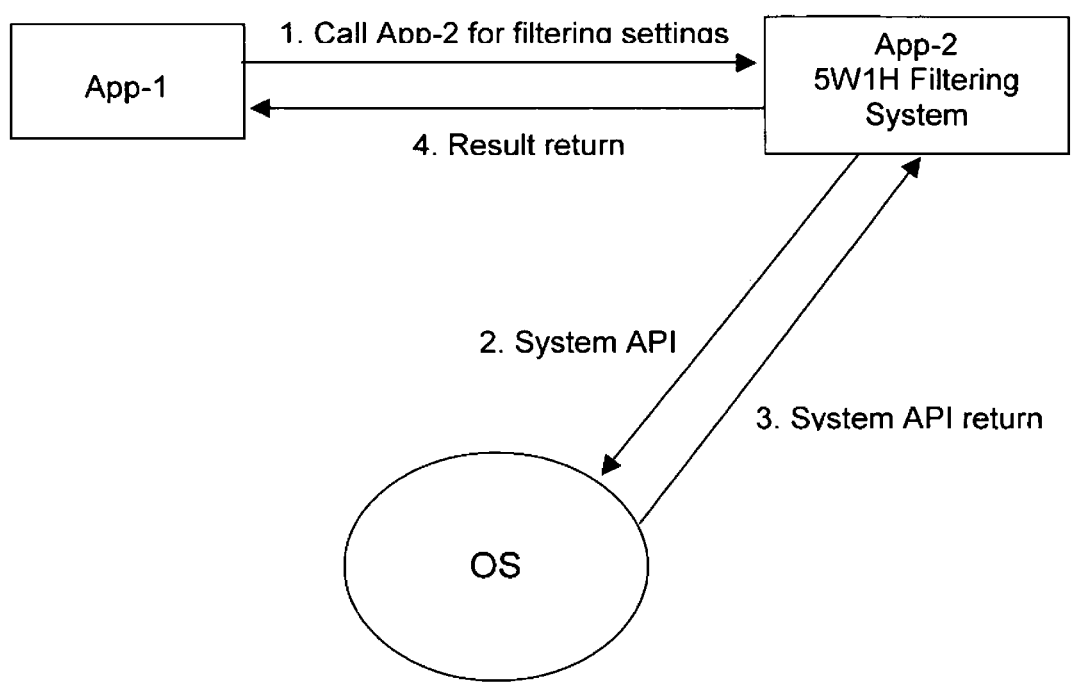
FIG. 2 is system diagram for showing data transmission and processes among the network-based communication system to carry out the user enquiry and retrieval among a mobile device and/or servers of the present invention.
Figure 3:
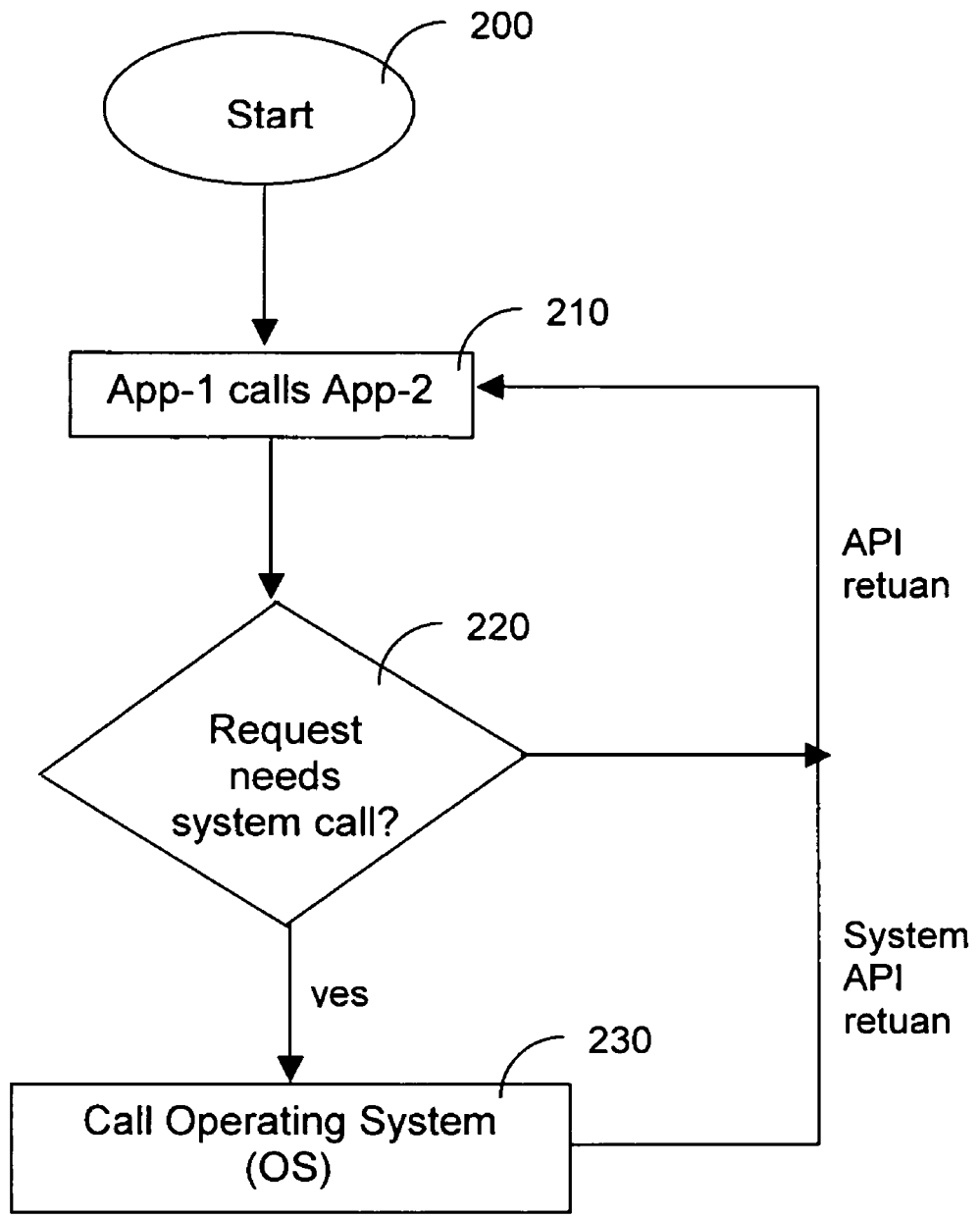

FIG. 2 is a system functional diagram and FIG. 3 is a flowchart to illustrate the processes performed in a mobile device by applying an inter-application communication scheme to build a "5W1H" like system of this invention. It is understood that such processes may be carried among a user and a server or a user terminal as well as that shown in FIG. 1. The inter-application communication process starts with a user starts an application (APP-1) from a mobile device (Step 200). The APP-1 then calls a 5W1H Application (APP-2) of this invention to allow a user of the mobile device to enter and define scopes of enquiries that may include 5W1H filtering terms to start the online search process (Step 210). Then, the APP-2 receives the user entry. The user entry may be in a form such as 5W1H://when&where&what/From=APP-1. The 5W1H Application then processes the user entries to determine if an inter-application system call is necessary depending on the scopes of data searches requested by the user (Step 220). If it is determined that a system call is not necessary, then an API return is provided to the APP-1. If the system call is necessary, then an inter-application communication call is made to the operation system (OS) of the mobile device, or a server depending on the scopes of the user request (Step 230). The processes are completed by retrieving a system API return from the OS back to the user through APP-1 as the "result return" as that request by the user.

The scopes of the enquiries can be conveniently defined without requiring changes made to the operating systems of a mobile device or a server or any data processing element. The inter-application communication scheme can be applied to link different levels of application to conveniently and flexibly link and activate different applications to process and retrieve required data and content needed for different levels of "Applications" implemented in a mobile device or any of the data processing elements as shown in FIG. 1.

Specifically, the 5W1H application, APP-2 of this invention enable a user to enter different types of enquiry terms and to more completely and accurately define a scopes as a targeted enquiry to starts a search process. Such processes provide convenient and flexible applications for a mobile device user such that the typing and data entry requirements are greatly reduced. A user may define different types of scopes that may be distinctly targeted by using the following 5W1H like attributes for searching the media files available on the networks.

When:
Event_time, when the event happens;
Create_time, when the file created;
Upload time, when the file uploaded to the system;
Public time, when the file is public to all users (a file is private by default).
The time logic is Event_time<=Create_time<=Upload_time<=Public_time.
Where:
Event_Longitude/Event_Latitude, where the event happen;
Event_GPS_Accuracy (0-100%), it may be 0 if the data is not from real time GPS receiver;
Create_Longitude/Create_Latitude, where the file create;
Create_GPS_Accuracy (0-100%);
IP_range, what kinds of ip address.
In some cases such as movies, the Event and Create attributes are different; but for real time news video, they are same.
Who:

Leading roles(s), it may be the name(s) of one or plural person, pet or building etc;

Owner, the writer or photographer.

What:

Category, the content category, for example, it may be Drama for movie file;

Rate, the content rated level, for example, PG for movie file.

Why:

reason, for_share or for_sale.

And other attributes (metadata tag) mentioned in another patent application: APT 61/296,479 "Method and system for image/audio/video metadata".

The following attributes will be defined for Applications:

When:

Start_time/End_time, the valid period for the application;

Schedule_day/Schedule_hour, the valid schedule time to run the application.

Where:

Longitude/Latitude scope, the valid district for the application;

Who:

Exec_by, who can run the application, System, Owner or Guest.

What:

Category, the application type, for example, Game or Education;

Rate, rated level.

Why:

Reason, for_share or for_sale.

How:

Real_time, if it runs all time even in background.

1. The Advertisement is a special Category application which will be executed by system only. The Advertisement developer must following the dedicated API to write the program and system will run it if some applications call the system advertisement function.
2. One or plural dSpace(s) can be defined in a system which can be a local computer system, network systems, or web-based system. Each dSpace will consist one or plural above media file(s) or application(s);
3. A dSpace is defined by series filter combinations with above file or application attributes and some special operators including BEFORE, AFTER, BETWEEN, IN, OUT, AND, OR and NOT etc. For example, the 2010 Winter Olympics dSpace will be defined as following filters:

(between Feb. 12, 2010 and Feb. 28, 2010) and
(Vancouver or Whistler) (by Longitude/Latitude scope) and
(NOT Advertisement application)

So when the user entry this dSpace, only those media files match the above filters are available.

4. A dSpace can be private or public. For public dSpace, everyone can see and join the dSpace; For private dSpace, only invited users can see the dSpace end can be approved then join the dSpace.
5. The dSpace support guest members which can view the content or activities in the dSpace but they can't run the application(s) in the dSpace and participate the activities.
6. A friend dSpace concept is supported which means that the members of a friend dSpace are guest of the dSpace.
7. The dSpace support inheritance concept so the sub-dSpace will have the base dSpace filters. The inheritance support multiple inheritances which allow plural parents (bases) dSpaces.
8. The present invention support multiple dSpace login at the same time and the user can have a dedicated nickname for each dSpace.
9. There is a "real_time" attribute to define if a dSpace will still run when it's in background. The system will check all the background dSpaces and run those "real_time" applications inside the "real_time" dSpace only.
10. An IP_Range is defined for a dSpace to filter login user ip address.
11. A User_network_speed for a dSpace to filter login user connecting speed.
12. A dedicated dSpace API is provided for developer so that they can develop the application running inside dSpace and those dSpace, files, user attributes can be accessed.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention. Those approaches and mechanisms in the art will appreciate variations of the above-described embodiments that fall within the scope of the invention. As a result, the invention is not limited to the specific examples and illustrations discussed above, but only the following claims and their equivalents.

I claim:

1. A mobile communication apparatus for use in managing information content in a network-based communication system, the apparatus comprising:

a processing element comprising a processor managed and operated by an operation system (OS) software and coupled to a memory;

the processing element executing a first application to call a second application by applying an inter-application communication for permitting the user to enter a plurality of defining terms for the second application to apply the defining terms as search filters and to determine if an inter-application system call is necessary depending on scopes of search filters entered by the user; and the second application generates directly an API return for the first application without invoking an inter-application system call if it is determined that the inter-application system call is not necessary otherwise the inter-application system call is made to the operating system (OS) for retrieving a system API return from the OS back to the user through the first application process wherein the system API return constituting a result requested by the user based on the search scopes defined by the search filters.

2. The mobile communication apparatus of claim 1 wherein:

the second application further provides a user interface for the user to enter the defining terms as a who-what-when-where-why and how (5W1H) defining term, as search filters for retrieving and generating data of the 5W1H depending on scopes of the defining terms entered by the user as the APT return for the first application.

3. A mobile communication device operated with an operating system (OS) to control and manage a plurality of application processes, further comprising:

a who-what-when-where-why and how (5W1H) application process, called by one of the plurality of application processes as a first application process, by applying an inter-application communication to allow a user of the mobile communication device to enter 5W1H scope-definition terms to carry out the 5W1H application process wherein the 5W1H application further examines search filters generated from the scope-definition terms to generate directly an API return for the first application process comprising 5W1H data requested by the user without invoking an inter-application system call if it is determined that the inter-application system call is not necessary, otherwise the inter-application system call is made to the operating system (OS) of the mobile communication device for retrieving a system API return from the OS back to the user through the first application process wherein the system API return constituting a result of requested by the user based on the scope-definition defined by the search filters.

4. The mobile communication device of claim 3 wherein:
the 5W1H application process is called by first application processes by applying the inter-application communication wherein the 5W1H application process further provides a user interface to allow a user of the mobile communication device to enter 5W1H scope-definition terms to carry out one of the plurality of application processes that calls the 5W1H application.

* * * * *